(12) United States Patent
Björnelund et al.

(10) Patent No.: US 10,407,037 B2
(45) Date of Patent: Sep. 10, 2019

(54) PNEUMATIC BRAKE SYSTEM FOR A COMMERCIAL VEHICLE

(71) Applicant: Scania CV AB, Södertälje (SE)

(72) Inventors: Tomas Björnelund, Södertälje (SE); Arne Lindqvist, Södertälje (SE)

(73) Assignee: SCANIA CV AB (SE)

( * ) Notice: Subject to any disclaimer, the term of this patent is extended or adjusted under 35 U.S.C. 154(b) by 212 days.

(21) Appl. No.: 15/525,991

(22) PCT Filed: Nov. 30, 2015

(86) PCT No.: PCT/SE2015/051280
§ 371 (c)(1),
(2) Date: May 11, 2017

(87) PCT Pub. No.: WO2016/099376
PCT Pub. Date: Jun. 23, 2016

(65) Prior Publication Data
US 2017/0313293 A1 Nov. 2, 2017

(30) Foreign Application Priority Data
Dec. 16, 2014 (SE) ...................................... 1451556

(51) Int. Cl.
*B60T 13/26* (2006.01)
*B60T 13/66* (2006.01)
(Continued)

(52) U.S. Cl.
CPC .......... *B60T 13/261* (2013.01); *B60T 13/268* (2013.01); *B60T 13/662* (2013.01); *B60T 13/683* (2013.01); *B60T 17/04* (2013.01); *B60T 17/06* (2013.01)

(58) Field of Classification Search
CPC .... B60T 13/261; B60T 13/268; B60T 13/683; B60T 17/06; B60T 17/04
See application file for complete search history.

(56) References Cited

U.S. PATENT DOCUMENTS 4,058,345 A   11/1977  Klimek ............................. 303/6
4,121,873 A * 10/1978  Durling ................. B60T 13/261
                                                    303/28
(Continued)

FOREIGN PATENT DOCUMENTS

CN      203592979 U    5/2014
DE   102006041009 A1   3/2008
(Continued)

OTHER PUBLICATIONS

Office Action dated Jul. 30, 2018 issued in corresponding Korean Patent Application No. 10-2017-7018796 with English translation.
(Continued)

*Primary Examiner* — Vishal R Sahni
(74) *Attorney, Agent, or Firm* — Ostrolenk Faber LLP (57) ABSTRACT

A pneumatic brake system (110) for a commercial vehicle (1) has one spring brake (27), a protection valve (56), a parking brake unit (30), a network of pipelines (40), at least a first (4) and a second (5) tank with compressed air and a relay valve (19) for the parking brake unit (30). A first subnetwork of pipelines (40*a*) comprises pipelines configured to be pressurized at all times. A second subnetwork of pipelines (40*b*) comprises at least one pipeline configured to be non-pressurized when the parking brake function is applied. The first subnetwork (40*a*) comprises pipelines establishing fluid communication between the tanks (4, 5) and the parking brake unit (30), wherein the direction of air flow in these pipelines is by at least one thereto associated valve (50). A method for managing an air flow to an air-actuated spring brake (27) of a pneumatic brake system (110) is disclosed.

23 Claims, 6 Drawing Sheets

(51) Int. Cl.
*B60T 13/68* (2006.01)
*B60T 17/06* (2006.01)
*B60T 17/04* (2006.01)

(56) References Cited

U.S. PATENT DOCUMENTS

| | | | |
|---|---|---|---|
| 7,784,879 B2 | 8/2010 | Koelzer | |
| 8,197,014 B2 | 6/2012 | Bensch | 303/9.66 |
| 8,297,714 B2 * | 10/2012 | Bensch | B60T 8/362 303/34 |
| D678,822 S | 3/2013 | Armigliato et al. | 12/93 |
| 2005/0029859 A1 | 2/2005 | Bensch et al. | 303/89 |
| 2008/0030068 A1 * | 2/2008 | Bensch | B60T 7/20 303/17 |
| 2009/0236904 A1 * | 9/2009 | Ripley | B60T 13/662 303/122.15 |
| 2009/0256416 A1 * | 10/2009 | Bensch | B60T 13/683 303/17 |
| 2009/0280959 A1 * | 11/2009 | Bensch | B60T 8/1708 477/198 |
| 2010/0072810 A1 * | 3/2010 | Bensch | B60T 8/362 303/17 |
| 2010/0078988 A1 * | 4/2010 | Bensch | B60T 13/683 303/3 |
| 2010/0237690 A1 * | 9/2010 | Forster | B60T 7/20 303/13 |
| 2012/0001477 A1 * | 1/2012 | Mederer | B60T 13/683 303/9.76 |

FOREIGN PATENT DOCUMENTS

| | | |
|---|---|---|
| DE | 102006041012 A1 | 3/2008 |
| DE | 102007047692 A1 | 4/2009 |
| EP | 1 859 972 A1 | 11/2007 |
| EP | 2641648 A2 | 9/2013 |
| JP | 2005-329814 | 12/2005 |
| JP | 2010-540352 | 12/2010 |
| KR | 10-2005-0037554 | 4/2005 |
| RU | 2 295 460 C2 | 3/2007 |
| WO | WO 2004/007256 A2 | 1/2004 |

OTHER PUBLICATIONS

Office Action dated Aug. 16, 2018 issued in corresponding Russian Patent Application No. 2017125163/14 with English translation.
European Search Report, dated Jun. 13, 2018, issued in corresponding European Patent Application No. EP15870452.8. Total 7 pages.
International Search Report dated Mar. 16, 2016 in corresponding PCT International Application No. PCT/SE2015/051280.
Written Opinion dated Mar. 16, 2016 in corresponding PCT International Application No. PCT/SE2015/051280.
Supplementary European Search Report dated Feb. 25, 2019 issued in European Patent Application No. 15870452.8-1012/3233597.
Korean Office Action dated Feb. 26, 2019 issued in Korean Patent Application No. 10-2017-7018796 with English language translation.

* cited by examiner

Fig. 1

PRIOR ART

PNEUMATIC BRAKE SYSTEM FOR A COMMERCIAL VEHICLE

CROSS-REFERENCE TO RELATED APPLICATIONS

The present application is a 35 U.S.C. §§ 371 national phase conversion of PCT/SE2015/051280, filed Nov. 30, 2015, which claims priority of Swedish Patent Application No. 1451556-3, filed Dec. 16, 2014, the contents of which are incorporated by reference herein. The PCT International Application was published in the English language.

TECHNICAL FIELD

On a general level, the present invention relates to a pneumatic brake system for a commercial vehicle.

Background

As a rule, pneumatic, i.e. air-based, brake systems are more robust and easier to service than their hydraulic counterparts. In consequence, they have found wide use on commercial vehicles such as heavy trucks and buses.

In order to comply with safety regulations, an air-based brake system of a vehicle is usually divided into a plurality of mutually independent air circuits wherein each air circuit is fed from a dedicated air tank, and the tanks are pressurized.

Accordingly, air necessary for proper operation of brakes acting on front/rear wheels is provided from an associated tank. Conventional service brakes for commercial vehicles are of either disc or drum type.

Figure 1:
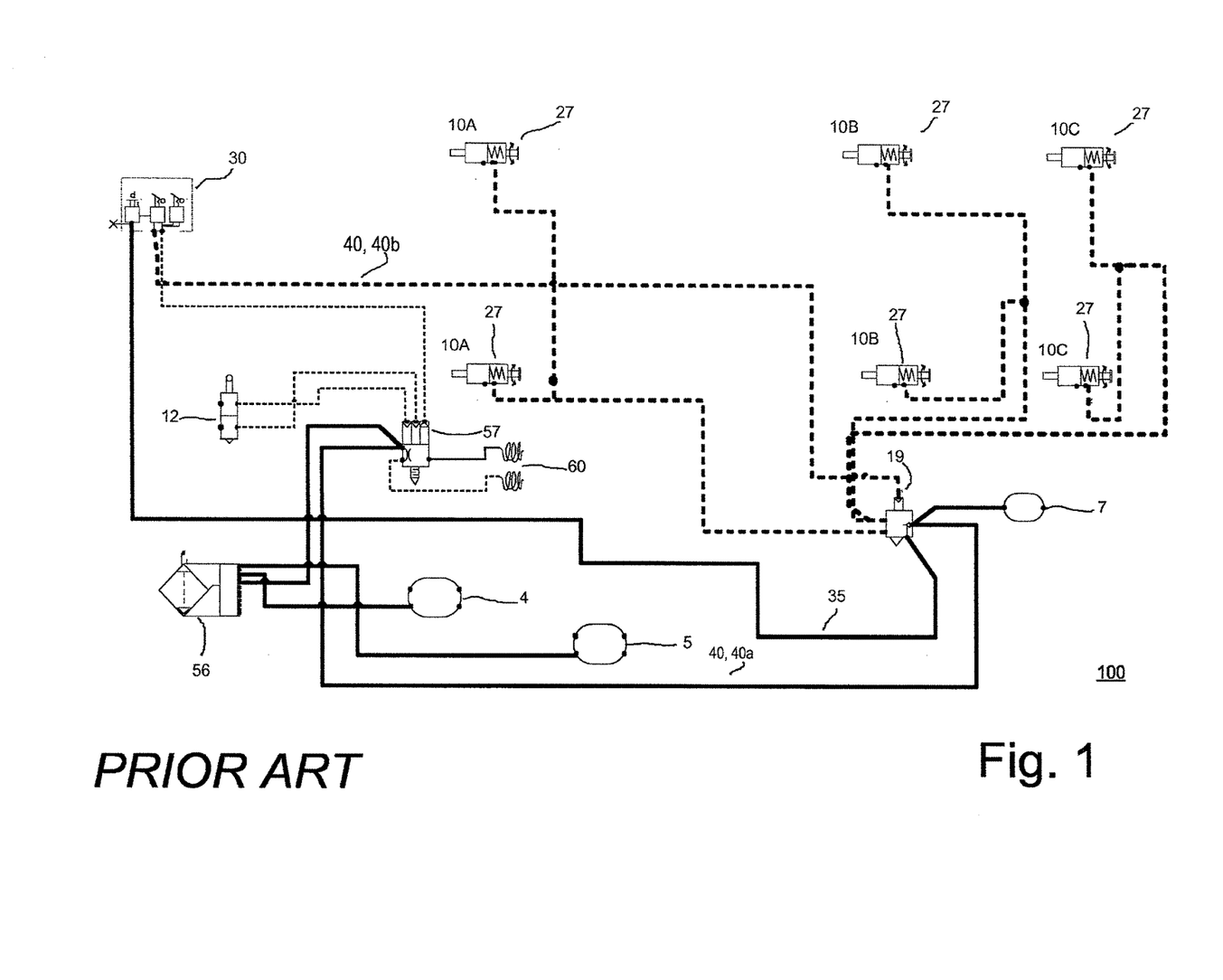
FIG. 1 schematically shows a pneumatic brake system belonging to the state of the art.

In the related context, a hand or parking brake of the commercial vehicle itself, as well as a service brake of a trailer, are traditionally served by a single air tank, located near rear axles of the vehicle and colloquially called "parking tank". Structurally, the parking brake comprises a brake cylinder that houses a spring. The brake is applied by exhausting the air from the brake cylinder so that the spring actuates a push rod of the service brake, thus immobilizing the wheel. Release of the parking brake results in air from the parking tank entering the brake cylinder and returning the spring to its original, compressed position so that the wheel again may rotate freely. A system of this kind is schematically shown in FIG. 1.

As a safety measure, certain commercial vehicles are fitted with a stop valve, also known as an interlock valve. Its purpose is to prevent automatic release of the parking brake during air replenishment of the pneumatic brake system.

Although parking tanks are relatively infrequently used and are significantly smaller than standard air tanks for front/rear wheels, the costs associated with manufacturing and installation of the parking tank are comparable with corresponding costs applicable in connection with a standard tank.

In a related context, one general characteristic of the vehicle development process is that the improvement, typically obtained by introducing novel technical feature(s), is to be achieved with minimal modification of the existing construction. An improvement, realized as a structural simplification, of the air supply system of a commercial vehicle is discussed in EP1859972A1.

On the above background, one objective of the present invention is to provide a simplified pneumatic brake system without major modifications of the original construction of the system. A further objective of the present invention is to prevent degradation of the performance of the constructionally simplified pneumatic brake system.

SUMMARY

The above stated objective is achieved by means of the pneumatic brake system, the method and the commercial vehicle disclosed herein.

Accordingly, a first aspect relates to a pneumatic brake system for a commercial vehicle. The system comprises at least one air-actuated spring brake configured to be arranged to at least one wheel of the vehicle. The spring brake is and configured to immobilize the commercial vehicle when a parking brake function of the pneumatic brake system is applied. The pneumatic brake has a protection valve, a parking brake unit, a network of pipelines, at least a first and a second air tank, both configured to be pressurized, for providing, via a respective first air outlet, air of the pneumatic brake system, a first subnetwork of pipelines, comprising pipelines configured to be pressurized at all times, and a second subnetwork of pipelines, comprising at least one pipeline configured to be non-pressurized when the parking brake function is applied, and a relay valve for the parking brake unit. The relay valve is configured to be in fluid communication with the first and the second tanks via the protection valve by means of the pipelines of the first subnetwork, the parking brake unit by means of the pipelines of the second subnetwork, and the at least one air-actuated spring brakes by means of the pipelines of the second subnetwork. The first subnetwork comprises pipelines establishing fluid communication between the first and the second tanks and the parking brake unit. The direction of air flow in these pipelines is configured to be controlled by at least one thereto associated valve.

Positive effects and advantages of the invention at hand are presented below with reference to the first aspect of the invention.

The technical solution according to the first aspect of the present invention renders possible removal of the parking tank. This is achieved without significant constructional alterations of thereon depending components. One achieved benefit is a reduction in manufacturing cost of the commercial vehicle in consequence of the removal of the dedicated parking tank. Moreover, the removal of the parking tank frees valuable space on the vehicle.

On the general level, removal of the parking tank without further system design modifications entails significant pressure drop in the system. This is at least in part due to the air path between the air tank and the parking brake being significantly prolonged. One consequence of this undesirable pressure drop is increase in time delay to attain required braking force. In the same context, a potential misinterpretation of the situation at hand by the stop valve associated with the parking brake could have equally serious consequences. In extreme cases, such a misinterpretation could lead to an inopportune application of the parking brake or an equally inopportune prevention of its release.

The technical solution at hand avoids a dedicated pipeline between the relay valve for the parking brake unit and the parking brake unit itself (present in the system belonging to the state of the art and visualized in FIG. 1). Instead, an analogous pipeline for supplying air to the parking brake unit is drawn between any of the first and the second tanks and the parking brake unit. As is known in the art, but also inferable from any of FIGS. 3-5, the first and the second air tanks and the parking brake unit are arranged in proximity to the front end of the commercial vehicle. The relay valve for the parking brake unit, on the other hand, is typically purposefully installed close to the parking tank. As a consequence, the air path to be covered is significantly reduced through the proposed technical solution. Accordingly, pressure drop in the pipelines may hereby be kept at an acceptable level. Moreover, these moderate pressure drops do not adversely affect the operation of the stop valve.

A second aspect relates to a method for managing an air flow to an air-actuated spring brake of a pneumatic brake system in connection with release of the parking brake function. The spring brake is configured to immobilize a commercial vehicle when a parking brake function of the pneumatic brake system is applied. The method comprising:
  releasing the parking brake function,
  providing, in response to the release of the parking brake function, air from either a first or a second air tank, both configured to be pressurized,
  restricting the direction of flow of the pressurized air, and
  conveying at least a portion of the provided air to the air-actuated spring brake of the pneumatic brake system.

A third aspect relates to a commercial vehicle comprising the claimed pneumatic brake system.

Further advantages and features of embodiments will become apparent when reading the following detailed description in conjunction with the drawings.

DETAILED DESCRIPTION

The present invention will now be described more fully with reference to the accompanying drawings, in which preferred embodiments are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements.

FIG. 1 schematically shows main components of a pneumatic, i.e. air-based, brake system 100 belonging to the state of the art. The visualized system 100 is implemented for ensuring parking brake functionality in a commercial vehicle 1 (shown in FIG. 2). A network of pipelines 40 comprises first sub-pipelines 40a that are pressurized at all times and second sub-pipelines 40b that are non-pressurized when the parking brake function is applied. Here, continuous lines represent a first subnetwork 40a comprising pipelines that are pressurized at all times, whereas a second subnetwork 40b, comprising pipelines that are non-pressurized when the parking brake function is applied, is represented by dashed lines.

Commercial vehicle 1 has a parking brake system 100 represented in FIG. 1, and has three axles, each with a respective pair of wheels 10A-10C thereon. A respective air-actuated spring brake 27 is configured to act on each wheel of the vehicle. The spring brake 27 immobilizes the wheel and the commercial vehicle when a parking brake function of the pneumatic brake system 100 is applied. The system 100 further comprises dedicated first and second tanks 4, 5 holding compressed air. Air pressure in each respective tank may be between 7.0 and 12.5 bar.

A protection valve 56 serving both tanks 4, 5 is also shown. Air, compressed by means of a compressor (not shown) and cleaned of water and oil by means of a drying unit (not shown), and then destined for the tanks 4, 5 passes by the protection valve 56. The protection valve 56 is a multi circuit protection valve and has the purpose of ensuring that an air leakage somewhere in the system 100 does not affect the entire brake system 100. Typically, the multi circuit protection valve 56 and the drying unit are integrated into a single unit. The structure of the protection valve of the above kind is known to those of skill in the art and, for that reason, is not described in more detail herein.

Further, a parking brake unit 30 controls implementation of the parking brake function on the wheels 10A-10C. A parking tank 7 is located in proximity to a relay valve 19 for the parking brake unit. The volume of the tank 7 normally ranges between 10-20 l. The relay valve 19 for the parking brake unit of the commercial vehicle 1 and its operative principle are known to those of skill in the art and, for that reason, are not described in detail herein. A pipe 35 extends between the relay valve 19 for the parking brake unit and the parking brake unit 30 itself.

The commercial vehicle according to this embodiment is adapted to haul a trailer. Therefore, a relay valve 57 for a trailer connection unit is also featured. Trailer connection unit 60 itself is highly schematically shown by two coil-shaped elements. The relay valve 57 for the trailer connection unit of the commercial vehicle 1 and its operative principle are known to those of skill in the art and, for that reason, are not described in detail herein. A service brake unit 12 controls implementation of a service brake function on the wheels 10A-10C.

Those of the above-mentioned components that are of relevance for the present invention will be more thoroughly discussed below, in conjunction with FIGS. 3-5. Remaining system components, already disclosed in connection with FIG. 1, will be discussed to the necessary extent.

Figure 2:
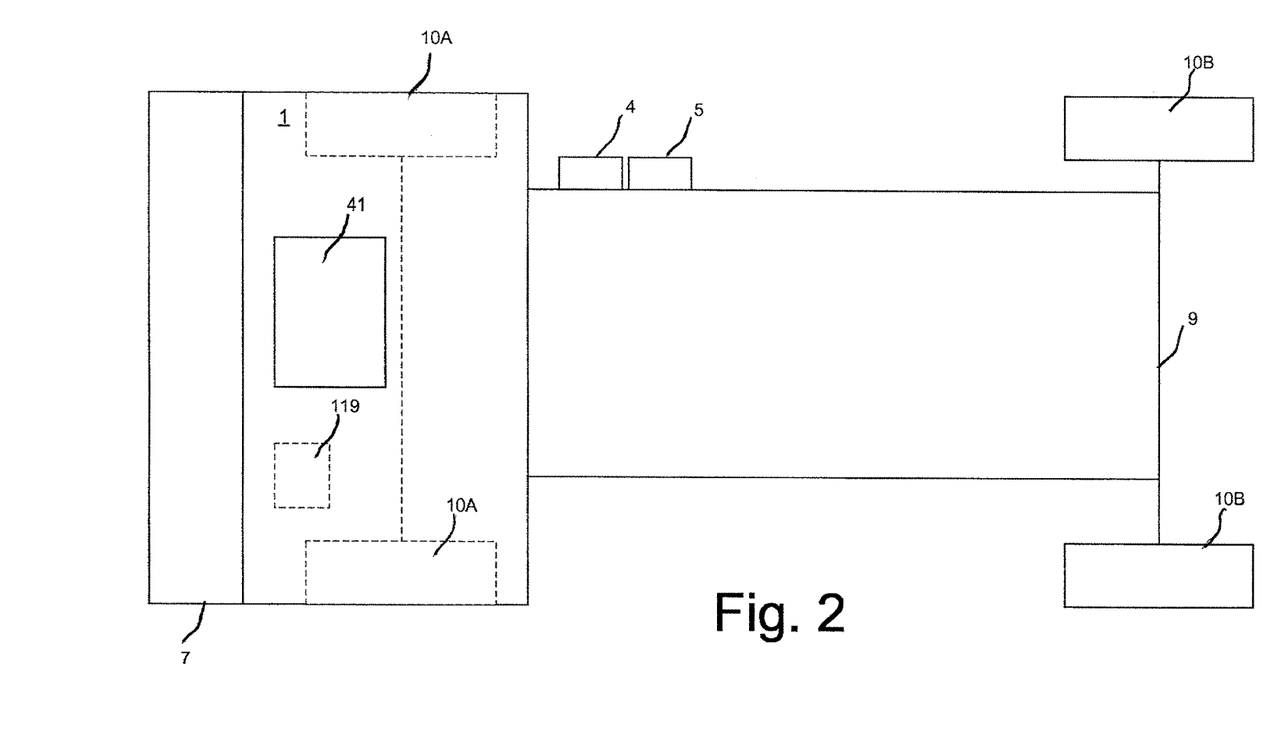
FIG. 2 is a schematic view from above of a commercial vehicle.

FIG. 2 is a schematic view from above of a commercial vehicle in which the invention is deployed. The commercial vehicle 1 is a truck or a trailer-hauling tractor. It includes a chassis 9 and a front pair of wheels 10A and a rear pair of wheels 10B. The shown vehicle is only an example. The commercial vehicle of the present invention may also be realized as a bus or a similar vehicle. A driver's cab 7 is positioned far forward on the vehicle 1. A combustion engine 41 is typically located below the driver's cab 7. As noted above, commercial vehicles are typically provided with pneumatic, i.e. air-based, brake systems comprising at least two air tanks 4, 5 with compressed air. These tanks are mounted on the chassis 9. Supply of the compressed air from the tanks 4, 5 to the other components of the pneumatic brake system is normally controlled by a control unit 119, schematically shown in FIG. 2.

Figure 3:
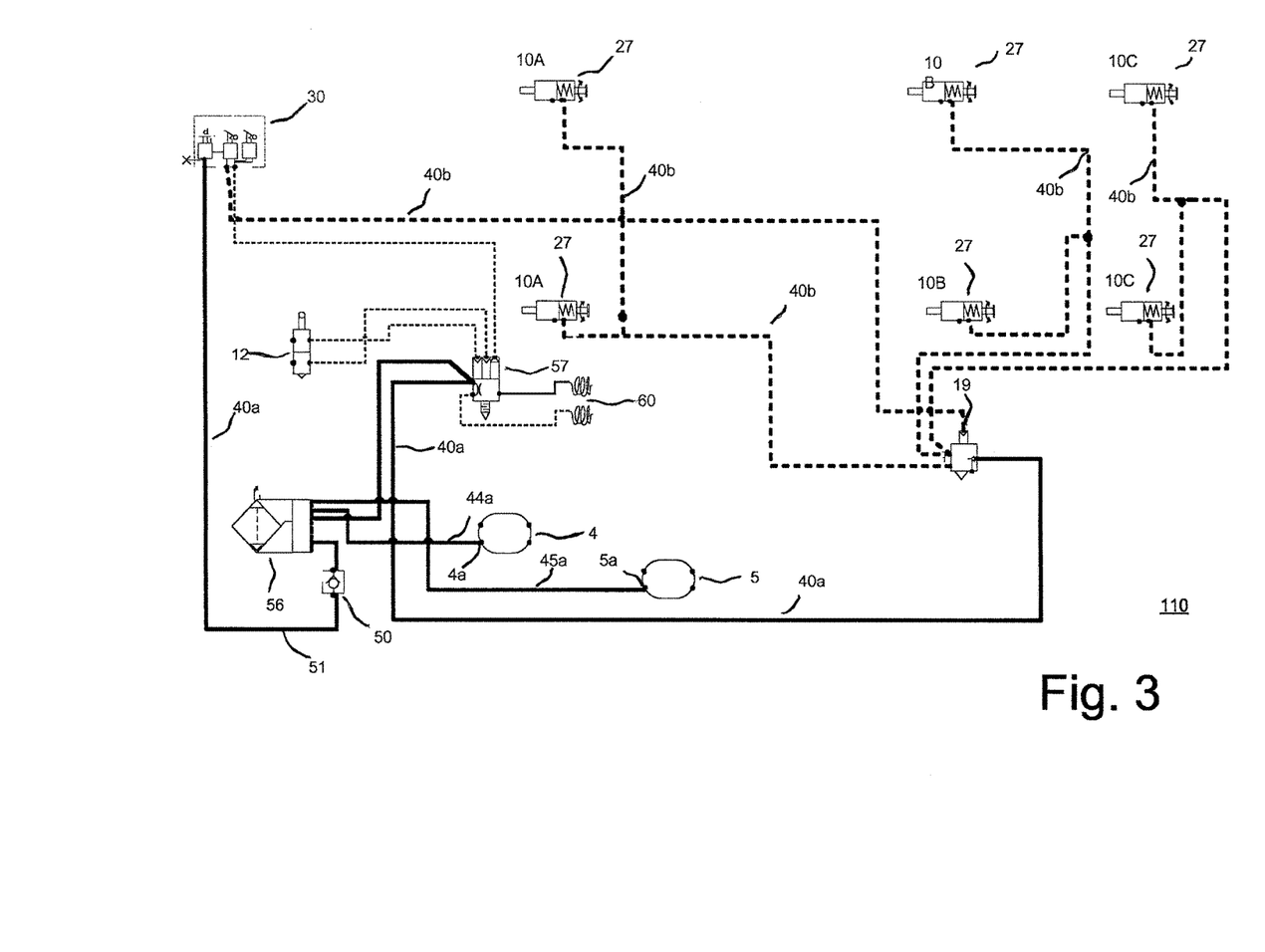
FIG. 3 schematically shows a pneumatic brake system according to a first embodiment of the present invention.

FIG. 3 schematically shows a pneumatic brake system 110 according to a first embodiment of the present invention. The system 110 shown is implemented for ensuring parking brake functionality in a commercial vehicle. A main structural difference relative to FIG. 1 (representing the state of the art) is that the system in FIG. 3 includes no dedicated parking tank. The commercial vehicle represented in FIG. 3 has also three axles, each axle having a respective pair of wheels 10A-10C and a spring brake 27 is arranged to each wheel. A first air tank 4 and a second air tank 5, which are both pressurized, provide, via a respective first air outlet 4a, 5a, air of the pneumatic brake system 110. The first tank 4 and the second tank 5 may either be arranged in parallel or in series. The freshly compressed air destined for the tanks 4, 5 passes by a protection valve 56.

Analogously to FIG. 1, continuous lines represent a first subnetwork 40a comprising pipelines that are pressurized at all times, whereas dashed lines represent a second subnetwork 40b comprising pipelines that are non-pressurized when the parking brake function is applied.

A parking brake unit 30 is shown. FIG. 3 further features a relay valve 19 for the parking brake unit. The relay valve 19 is in fluid communication with the first 4 and the second 5 tanks via the protection valve 56 by means of the pipelines of the first subnetwork 40a. The valve 19 is also in fluid communication with the parking brake unit 30 by means of the pipelines of the second subnetwork 40b. Lastly, the relay valve 19 is in fluid communication with the spring brakes 27 by means of the pipelines of the second subnetwork 40b.

Fluid communication is established between the first 4 and the second 5 tanks and the parking brake unit 30. More specifically, a pipe 44a, 45a connects the respective tanks 4, 5 with the protection valve 56. A first pipe 51 extends between the protection valve 56 and the parking brake unit 30.

The direction of air flow in these pipelines is configured to be controlled by at least one thereto associated valve 50, e.g. a check valve, so oriented that it prevents air from flowing towards the protection valve 56. In the shown embodiment, the check valve 50 is arranged in the pipe 51 extending between the protection valve 56 and the parking brake unit 30. In a related embodiment (not shown), the check valve 50 is integrated in the protection valve 56. Where applicable, remaining system components shown have the same structure and function as their counterparts discussed in conjunction with FIG. 1.

In FIG. 3, a dedicated pipe 35 pipe shown in FIG. 1 between the relay valve 19 for the parking brake unit and the parking brake unit 30 itself may be dispensed with. Instead, an analogous pipeline for supplying air to the parking brake unit 30 is drawn between any of the first 4 and the second 5 tanks and the parking brake unit 30. As a consequence, the air path to be covered is significantly reduced. Accordingly, a pressure drop in the pipelines may be better kept at an acceptable level. A further benefit is a reduction in manufacturing cost of the commercial vehicle in consequence of the removal of the dedicated parking tank. Finally, the removal of the parking tank frees valuable space on the vehicle.

Figure 4:
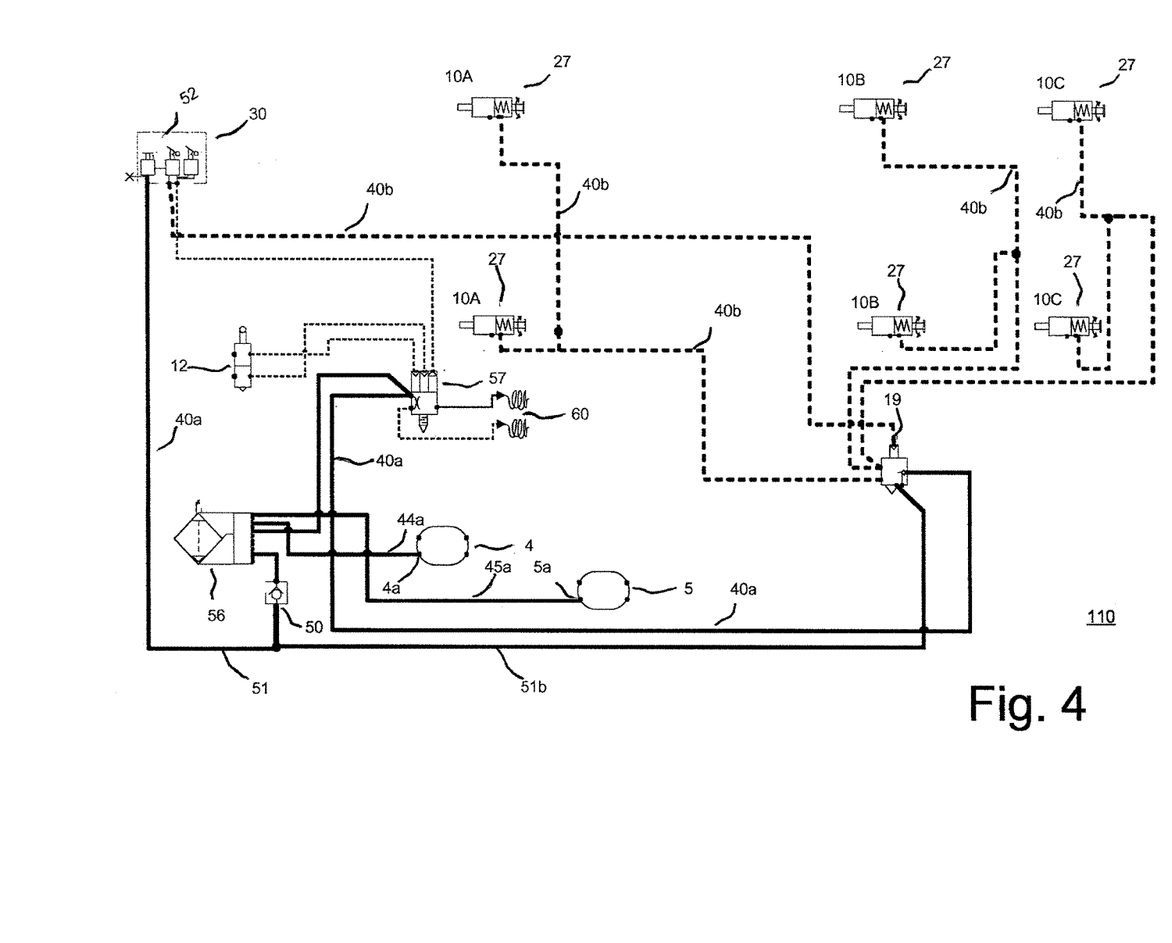
FIG. 4 schematically shows a pneumatic brake system according to a second embodiment of the present invention.

FIG. 4 schematically shows a pneumatic brake system 110 according to a second embodiment of the present invention. A main structural difference relative the embodiment represented by FIG. 3 is the addition of a second pipe 51b extending between the check valve 50 and the relay valve 19 for the parking brake unit. In this context, the second pipe 51b has an inner diameter that does not exceed 8 mm. Hereby, the release of the parking brake also when air tanks 4, 5 are empty is made possible. Compressed air required may then be supplied from e.g. an external air tank or even from one of the tires of the commercial vehicle. A larger conduit diameter could cause prohibitively large pressure drops that would disturb operation of a stop valve 52 which is part of the parking brake unit 30.

Remaining system components shown have the same structure and function as their counterparts discussed in conjunction with FIGS. 1 and 3.

Figure 5:
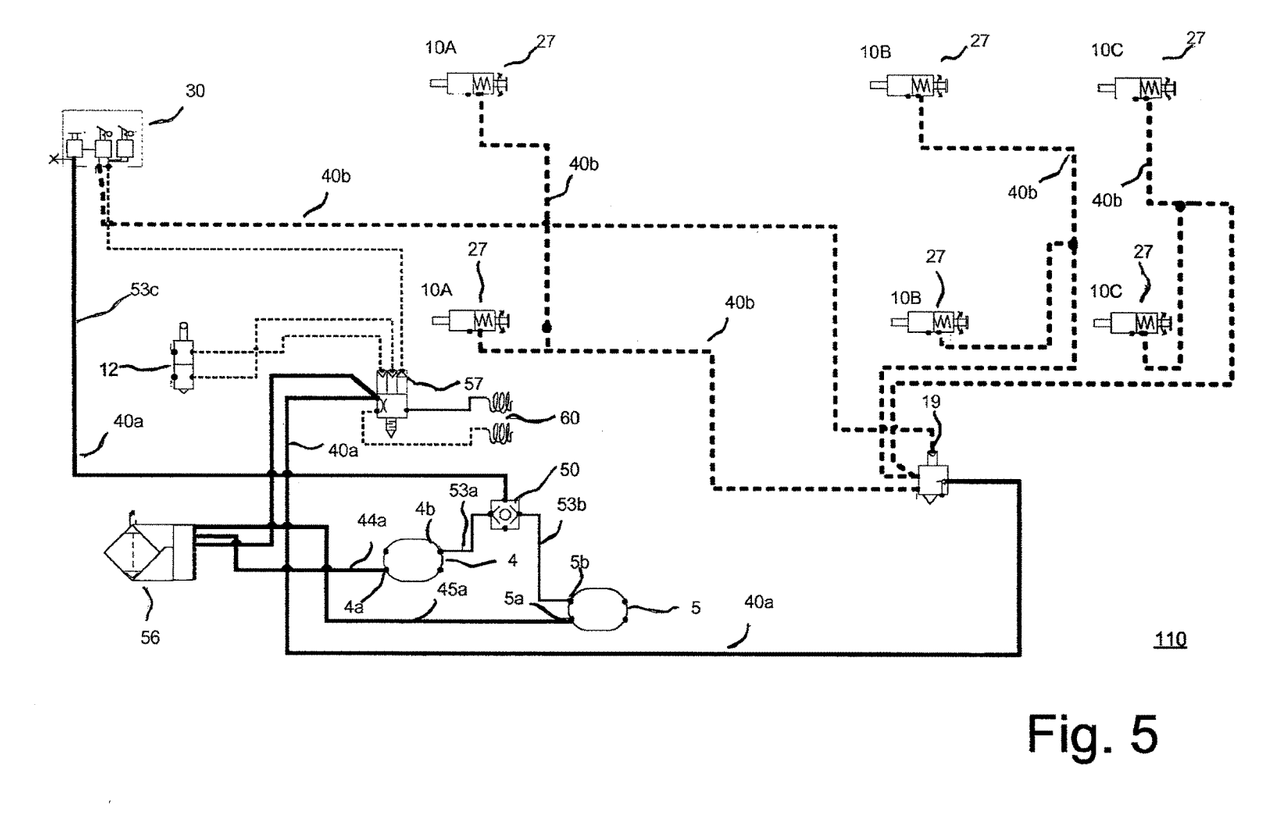
FIG. 5 schematically shows a pneumatic brake system according to a third embodiment of the present invention.

FIG. 5 schematically shows a pneumatic brake system 110 according to a third embodiment of the present invention. Here, the first 4 and the second 5 tanks each have a second air outlet 4b, 5b and the pipelines 53a and 53b establishing fluid communication between the first and the second tanks and the parking brake unit 30 extend between the respective second air outlet 4b, 5b and the parking brake unit 30. Said pipelines comprise two pipes 53a, 53b emanating from the respective second air outlet 4b, 5b. A double check valve 50 is arranged at a junction of these pipes 53a, 53b. A single pipe 53c connects the double check valve 50 and the parking brake unit 30. The double check valve 50 is so oriented that it prevents air from flowing towards the first 4 and the second 5 tanks. The double check valve 50 may be realized in a plurality of ways. By way of example by providing a valve with two valve membranes sharing a common spring, or by providing a ball valve able to stop flow from one of the conduits at a time. This solution confers substantially the same positive effects as that discussed in conjunction with FIG. 3.

As previously stated in conjunction with FIG. 1, a commercial vehicle is adapted to haul a trailer. Therefore, a relay valve for a trailer connection unit 57 is also featured in FIGS. 3-5. Trailer connection unit 60 itself is highly schematically shown by means of two coil-shaped elements. The relay valve 57 for a trailer connection unit is in fluid communication with the first 4 and the second 5 tanks via the protection valve 56 by means of the pipelines of the first subnetwork 40a. The relay valve 57 for a trailer connection unit is also in fluid communication with the relay valve 19 for the parking brake unit by means of the pipelines of the first subnetwork 40a.

The pneumatic brake system further comprises a control unit 119 (schematically shown in connection with FIG. 2). The control unit 119 may be an integrated part of the pneumatic brake system. The control unit 119 typically has a processing unit and a memory unit connected to the processing unit. The processing unit may comprise one or several CPUs (CPU—Central Processing Unit). The memory unit could be of the non-volatile kind, e.g. a flash memory, or a RAM-memory (RAM—Random Access Memory). The processing unit is configured to carry out the instructions of the computer program P with computer instructions. The computer program P could be recorded on a carrier, typically a non-volatile computer readable medium, prior to being loaded onto the memory unit. Alternatively, it could be preinstalled in the memory unit. The disclosed embodiments of the method are performed when the computer program P is executed such that above-mentioned instructions are carried out by the suitably configured processing unit.

In response to application of the parking brake function, the control unit 119 is configured to generate a first signal resulting in depressurization of the pipelines of the second subnetwork. In response to release of the parking brake function, the control unit 119 is further configured to generate a second signal resulting in pressurization of at least a part of pipelines of the second subnetwork.

According to an embodiment, in response to release of the parking brake function, the control unit 119 may be configured to, compare air pressure in the first tank 4 with air pressure in the second tank 5 and, upon that comparison, generate said second signal resulting in pressurization of at least a part of pipelines of the second subnetwork. That pressurization is then achieved using air with higher air pressure originating from the tank.

The control unit 119 communicates with valve actuators via a bus, e.g. a CAN-bus (CAN—Controller Area Network) that uses a message based communication protocol. Other communication protocols, such as TTP (Time-Triggered Protocol) or Flexray may also be used. In this way, the above-discussed signals may be exchanged between different units of the commercial vehicle. By way of example, signals may be wirelessly transmitted.

Figure 6:
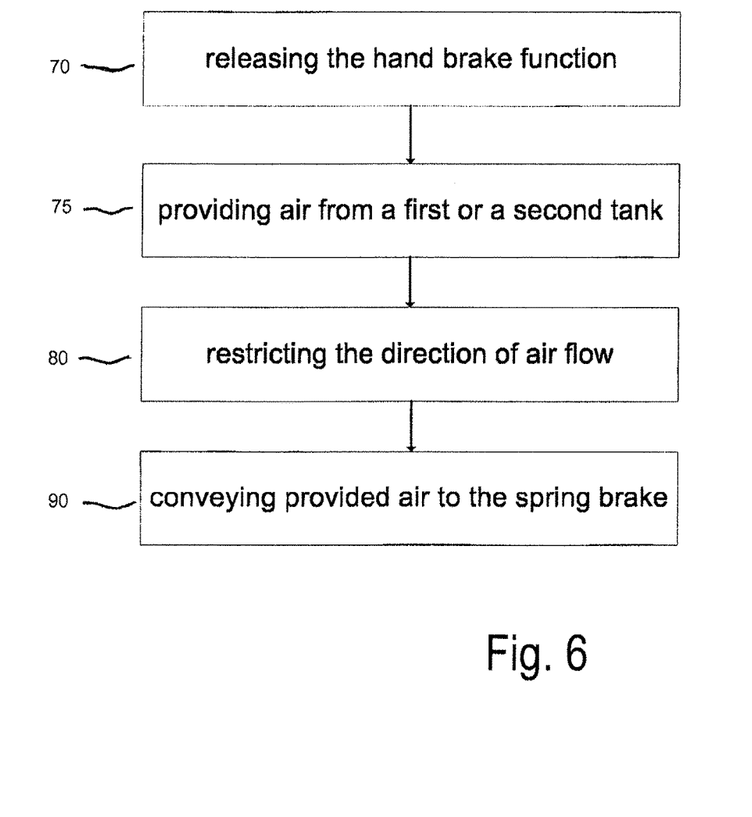
FIG. 6 is a flow chart comprising method steps according to an embodiment of the present invention.

FIG. 6 is a flow chart comprising method steps according to an embodiment of the present invention. The flow chart shows a method for managing an air flow to an air-actuated spring brake of a pneumatic brake system that was previously described in connection with FIGS. 3-5.

The method disclosed in FIG. 6 comprises releasing 70 the parking brake function, providing 75, in response to the release of the parking brake function, air from either a first or a second air tank, both configured to be pressurized, restricting 80 the direction of flow of the pressurized air, and conveying 90 at least a portion of the provided air to the air-actuated spring brake of the pneumatic brake system. More specifically, at least a portion of the provided air is conveyed to the parking brake unit 30 either via the protection valve 56 and a check valve 50, as described in connection with FIG. 3, or via the double check valve 50, as described in connection with FIG. 5. This air is subsequently channeled towards the spring brakes 27 arranged in connection with the individual wheels as previously described. As a consequence, the spring of each spring brake is decompressed and the push rod of the service brake is actuated such that each wheel becomes immobilized. Direction of the air flow downstream of the check valve 50 respectively double check valve 50 needs to be restricted so that the air flows towards the spring brake 27. Advantages discussed in connection with FIGS. 3-5 are conferred by the method as well.

The present invention also relates to a computer program P that comprises a computer program code to cause the previously discussed control unit, or a computer connected to the control unit, to perform the method described above.

In addition, a computer program product is provided comprising a computer program code stored on a non-volatile computer-readable medium to perform the method described above, when the computer program code is executed by the control unit 19 or by a computer connected to the control unit.

In the drawings and specification, there have been disclosed typical preferred embodiments of the invention and, although specific terms are employed, they are used in a generic and descriptive sense only and not for purposes of limitation, the scope of the invention being set forth in the following claims.

The invention claimed is:

1. A pneumatic brake system for a commercial vehicle, the system comprising:
an air-actuated spring brake configured to be arranged to at least one wheel of the vehicle and also configured to immobilize the commercial vehicle when a parking brake function of the pneumatic brake system is applied;
a parking brake unit;
at least a first air tank and a second air tank, each tank being configured to be pressurized, and each tank having a respective first air outlet for providing air of the pneumatic brake system;
a protection valve for the respective first air outlets for preventing return flow of air to the first and second tanks;
a network of pipelines comprising a first subnetwork of pipelines configured to be air pressurized at all times and the network comprising:
a second subnetwork of pipelines, comprising at least one pipeline configured to be non-pressurized by air when the parking brake unit has a braking function that is applied;
a relay valve for the parking brake unit, the relay valve being configured to be in fluid communication with the first tank and the second tank via the protection valve by the pipelines of the first subnetwork, with the parking brake unit by the pipelines of the second subnetwork, and with the at least one air-actuated spring brake by the pipelines of the second subnetwork;
the pneumatic brake system further comprises a stop valve associated with the parking brake unit and configured for prevention of one of inopportune application or release of the parking brake unit; and
the first subnetwork of pipelines comprising pipelines establishing fluid communication between the first tank and the second tank and the parking brake unit and at least one associated valve is configured to control a direction of air flow in the first subnetwork of pipelines, wherein the associated valve is a check valve,
wherein the check valve is in a pipeline that extends between the parking brake unit and the protection valve, or the check valve is a double check valve connected to a pipeline that extends to the parking brake unit, a pipeline that is connected to the first tank, and another pipeline connected to the second tank.

2. A pneumatic brake system according to claim 1, wherein the first subnetwork of pipelines establishes fluid communication between the first tank and the second tank and the parking brake unit past the protection valve which is configured to control the direction of air flow.

3. A pneumatic brake system according to claim 1, wherein the check valve is so oriented and configured that it prevents air from flowing towards the protection valve.

4. A pneumatic brake system according to claim 3, wherein the check valve is integrated in the protection valve.

5. A pneumatic brake system according to claim 1, wherein the first subnetwork includes a pipe branched downstream in the flow of air past the check valve, with a first pipe branch of the pipe extending to the parking brake unit and a second pipe branch of the pipe extending to the relay valve for the parking brake unit.

6. A pneumatic brake system according to claim 5, wherein the second pipe branch has a diameter less than 8 mm.

7. A pneumatic brake system according to claim 1, wherein the first tank and the second tank each have a respective second air outlet and the subnetwork pipelines establish fluid communication between the first tank and the second tank and the parking brake unit and also extend between the respective second air outlets and the parking brake unit.

8. A pneumatic brake system according to claim 7, wherein the check valve is arranged at a junction of the pipelines from the air outlets of the tanks.

9. A pneumatic brake system according to claim 1, wherein the double check valve is oriented to prevent air from flowing towards the first tank and the second tank.

10. A pneumatic brake system according to claim 1, wherein the first tank and the second tank are arranged in parallel.

11. A pneumatic brake system according to claim 1, wherein the first tank and the second tank are serially arranged.

12. A pneumatic brake system according to claim 1, further comprising a relay valve for a trailer connection unit for connecting the vehicle to a trailer, the relay valve for a trailer connection unit being in fluid communication with the first tank and the second tank via the protection valve by means of the pipelines of the first subnetwork of pipelines.

13. A pneumatic brake system according to claim 12, wherein the relay valve for the trailer connection unit is also in fluid communication with the relay valve for the parking brake unit by means of the pipelines of the first subnetwork of pipelines.

14. A pneumatic brake system according to claim 1, further comprising a control unit configured, in response to application of the parking brake function, to generate a first signal resulting in depressurization of the pipelines of the second subnetwork of pipelines.

15. A pneumatic brake system according to claim 14, further comprising the control unit further being configured, in response to release of the parking brake function, to generate a second signal resulting in pressurization of at least a part of the pipelines of the subnetwork of pipelines.

16. A pneumatic brake system according to claim 15, further comprising the control unit further being configured, in response to release of the parking brake function, to compare air pressure in the first tank with air pressure in the second tank.

17. A pneumatic brake system according to claim 16, wherein upon making a comparison, the control unit generating the second signal, resulting in pressurization of at least a part of the pipelines of the second subnetwork of pipelines , and the air originating from the tank with higher air pressure.

18. A pneumatic brake system according to claim 1, wherein the stop valve is arranged in the parking braking unit.

19. A commercial vehicle comprising a pneumatic brake system according to claim 1.

20. A method for managing an air flow to an air-actuated spring brake of a pneumatic brake system in connection with release of a parking brake function of the pneumatic brake system, wherein the pneumatic brake system comprises a stop valve associated with a parking brake unit for prevention of inopportune application or release of the parking brake unit, and the spring brake is configured to immobilize a commercial vehicle when a parking brake function of the pneumatic brake system is applied, the method comprising:
  releasing the parking brake function;
  providing, in response to the release of the parking brake function, air from either a first air tank or a second air tank, both tanks configured to be pressurized;
  restricting the direction of flow of the pressurized air; and
  conveying at least a portion of the provided air to the air-actuated spring brake of the pneumatic brake system,
  wherein the pneumatic brake system further comprises a double check-valve arranged intermediate each of the first tank and the second air tank and the spring brake; the method further comprising,
  conveying the air to the air-actuated spring brake via the double check-valve; and
  restricting a direction of the air flow downstream of the double check-valve so that it only flows towards the spring brake, or
  wherein the pneumatic brake system further comprises a check valve in a pipeline that extends from the parking brake unit to a protection valve, the method further comprising, preventing air from flowing toward the protection valve with the check valve.

21. A method according to claim 20, wherein the protection valve is arranged intermediate each of the first tank and the second air tank and the spring brake, the method further comprising:
  conveying the air to the air-actuated spring brake via the protection valve; and
  restricting a direction of the air flow downstream of the protection valve to only flow towards the spring brake.

22. A method according to claim 20, wherein the pneumatic brake system further comprises a relay valve for the parking brake unit, the method further comprising:
  conveying at least a portion of the provided air to the relay valve for the parking brake unit.

23. A computer program product comprising a non-volatile computer-readable medium and a computer program code stored on the medium;
  the computer program code being configured to cause a control unit, or a computer connected to the control unit to perform the method according to claim 20, when the computer program code is executed by a control unit or by a computer connected to the control unit.

\* \* \* \* \*